July 4, 1950  J. C. WOODFORD ET AL  2,513,701
FLUID DISPENSING APPARATUS
Filed Oct. 11, 1945  5 Sheets-Sheet 2
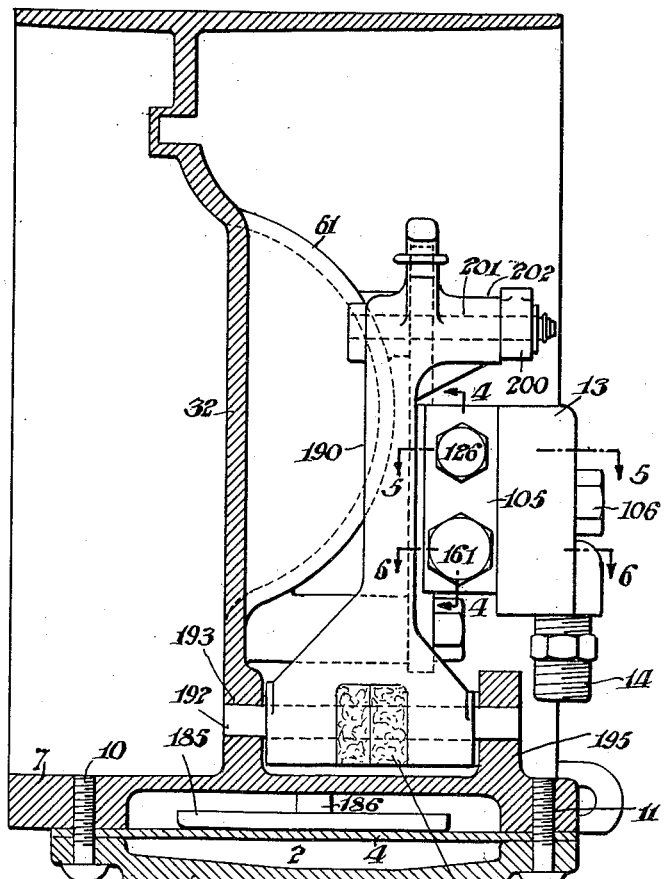
Fig. 2.
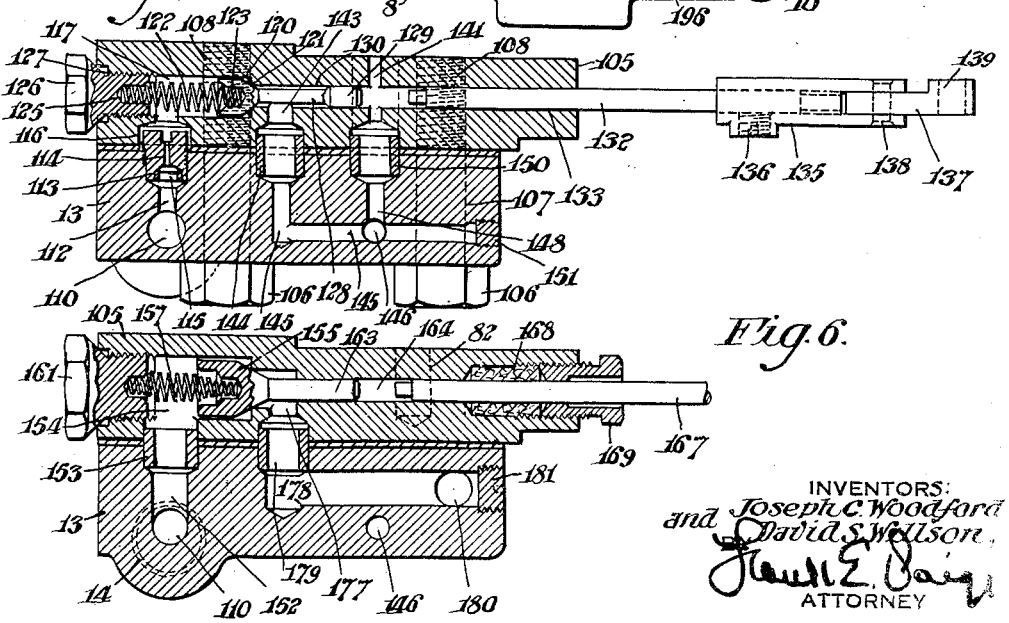
Fig. 5.
Fig. 6.
INVENTORS:
Joseph C. Woodford
and David S. Willson
ATTORNEY

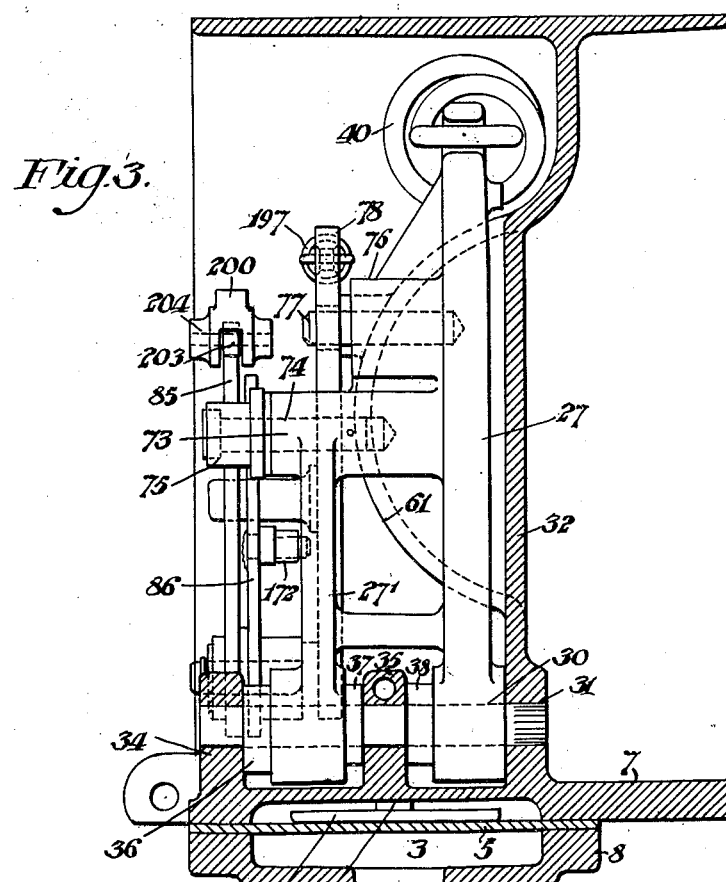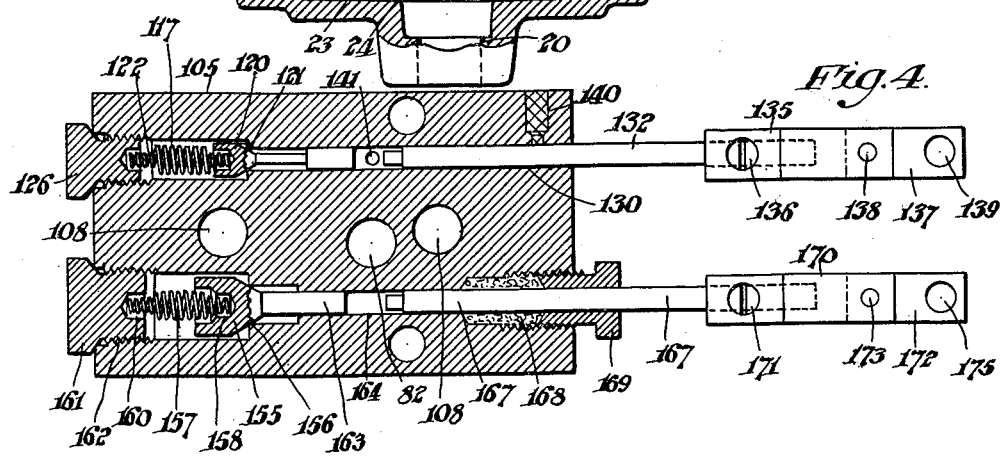

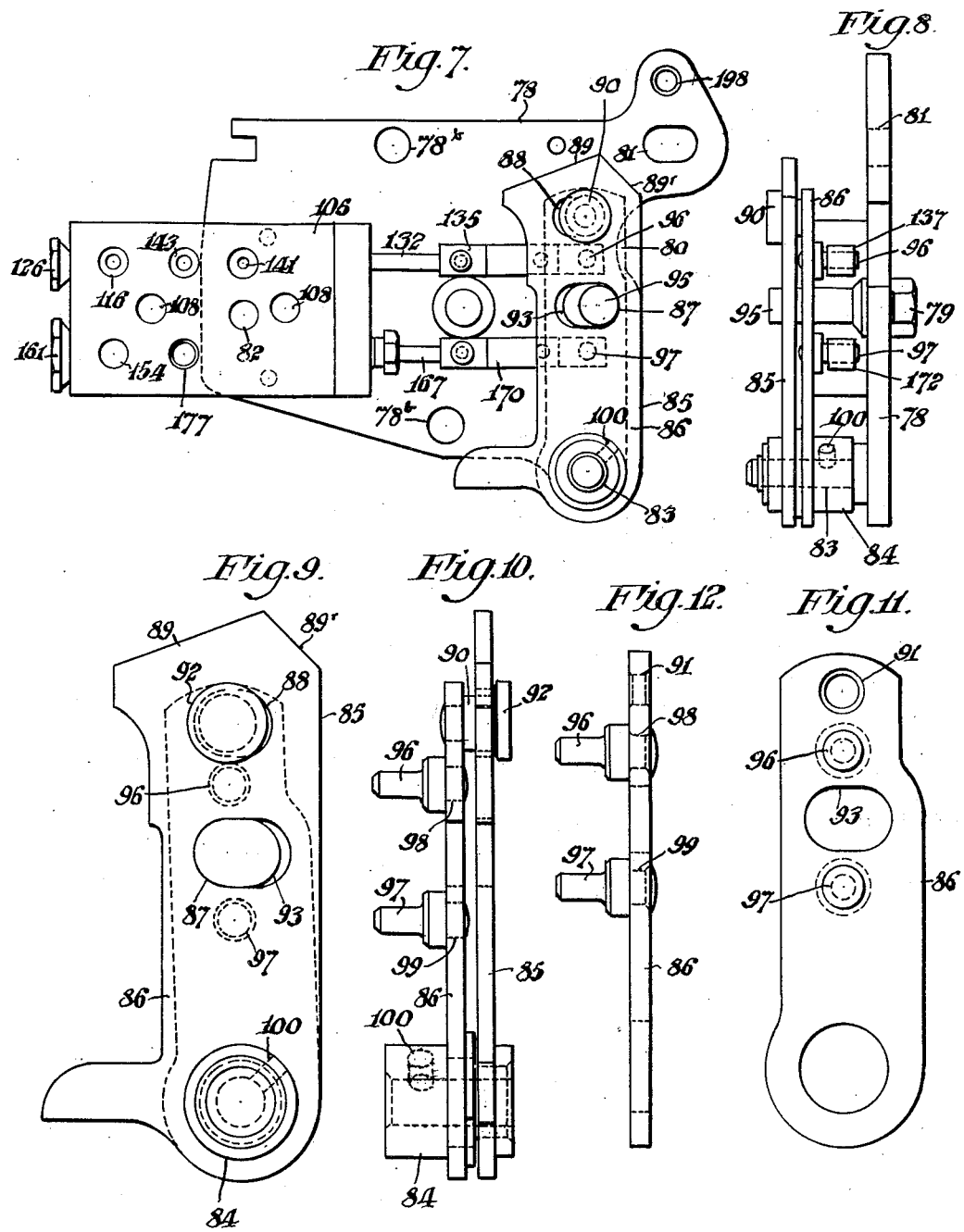

July 4, 1950   J. C. WOODFORD ET AL   2,513,701
FLUID DISPENSING APPARATUS

Filed Oct. 11, 1945   5 Sheets-Sheet 5

INVENTORS:
Joseph C. Woodford
and David S. Willson,
BY
ATTORNEY

Patented July 4, 1950

2,513,701

UNITED STATES PATENT OFFICE 2,513,701

FLUID DISPENSING APPARATUS

Joseph C. Woodford, Spring Lake, and David S. Willson, Muskegon Heights, Mich., assignors to John Wood Manufacturing Company, Inc., Philadelphia, Pa., a corporation of Delaware Application October 11, 1945, Serial No. 621,808

7 Claims. (Cl. 50—10)

Our invention relates to improvements in fluid dispensing apparatus which is adaptable for charging any air receiver to a predetermined pressure. Our invention may be embodied with particular advantage in apparatus used in automobile service stations for inflating the tires of motor vehicles to a predetermined pressure. It is ordinary practice in service stations to highly compress air, say from 100 to 150 pounds per square inch, by a compressor operated by an electric motor, and to store such highly compressed air in a supply tank from which it may be released through dispensing apparatus which is adjustable to predetermine the pressure to which any air receiver may be charged.

Our present invention provides a fluid dispensing apparatus of simple, solely mechanical, design which operates in a uniformly intermittent manner, over a wide range of combinations of pressure adjustment and initial receiver pressure. Our invention operates in positively controlled cycles of pulsating charges of fluid to a receiver; each charge of fluid being terminated at intervals after it is initiated.

Our device does not require any appreciable energy drain from, or reduction in, the available pressure of a fluid to be delivered to the receiver. This is accomplished by utilizing the energy of the fluid directly from the source to furnish power for operating the apparatus, which fluid is subsequently exhausted to atmosphere.

The embodiment of our invention illustrated includes two separate and distinct diaphragm chambers each containing a flexible diaphragm, the fluid pressure upon which is opposed by separate and distinct springs. One of said diaphragms is subjected to fluid pressure from the air dispensing conduit and the other of said diaphragms is subjected to fluid pressure directly from the supply reservoir. Our present invention provides a simplified construction and arrangement of controlling valve actuating means operatively connected with said two diaphragms and their springs for adjustably controlling the dispensation of the fluid.

The form of our invention illustrated lends itself particularly to quantity production because component parts thereof may be assembled as subassemblies and the subassemblies readily and facilely assembled to form the complete device.

Our invention comprises the various novel features of construction and arrangement hereinafter more definitely specified.

In said drawings; Fig. 1 is an elevation of our invention as embodied in a casing, but with the cover of the casing omitted.

Fig. 2 is a left-hand end vertical sectional view of the structure shown in Fig. 1, taken on the line 2—2 in Fig. 1.

Fig. 3 is a right-hand end vertical sectional view of the structure shown in Fig. 1, taken on the line 3—3 in Fig. 1.

Fig. 4 is a vertical sectional view, partly in elevation, of the valve body unit assembly indicated in Figs. 1 and 2, taken on the line 4—4 in Fig. 2.

Fig. 5 is a horizontal sectional view of the valve body unit assembly indicated in Figs. 1 and 2, taken on the line 5—5 in Fig. 2.

Fig. 6 is a horizontal sectional view of the valve body unit assembly indicated in Figs. 1 and 2, taken on the line 6—6 in Fig. 2.

Fig. 7 is an elevation of the valve and cam unit assembly indicated in Fig. 1.

Fig. 8 is a right-hand elevation of the structure shown in Fig. 7.

Fig. 9 is an elevation of the cam assembly indicated in Fig. 1.

Fig. 10 is a left-hand elevation of the cam assembly shown in Fig. 9.

Fig. 11 is an elevation of the auxiliary valve cam indicated in Figs. 1 and 9.

Fig. 12 is a left-hand elevation of the structure shown in Fig. 11.

Figure 1:
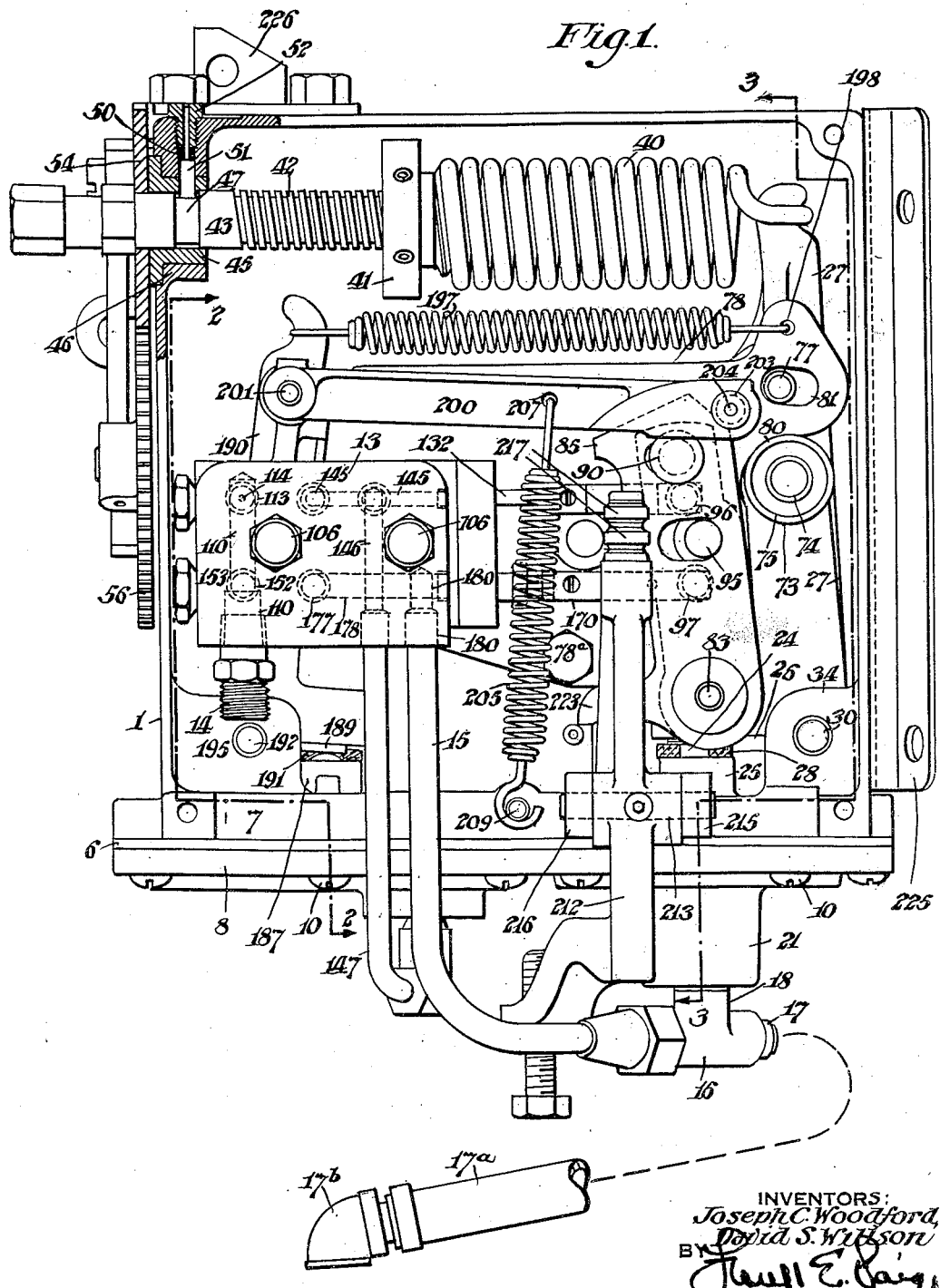

In said drawings, the main casing 1 incloses the motor diaphragm chamber 2 and the inflator diaphragm chamber 3, each containing a reciprocatory diaphragm, respectively indicated by the reference marks 4 and 5. The diaphragms 4 and 5 conveniently are formed from portions of the diaphragm material 6 which conveniently extends across the bottom wall 7 of the main casing 1, and is clamped in fluid tight relationship between said bottom wall 7 and the closure plate 8 for said diaphragm chambers 2 and 3 by means of a series of screws 10. Said screws 10 extend through a series of holes in the perimeter of the closure plate 8 and the diaphragm material 6 into matching screw threaded openings 11 formed in the bottom wall 7 of the main casing 1.

A supply of fluid under high pressure is connected to the valve manifold 13 through the conduit fitting 14. The conduit 15 connects the valve manifold 13 with the T-fitting 16, the right-hand end 17 of which is adapted to be connected with a fluid service conduit 17a having at the distal end thereof a suitable connector 17b, or air valve chuck, for convenient attachment to the valve stem of an automobile tire. Such air chucks are of well known construction and include a valve which closes to prevent air escaping from the hose when the chuck is not attached to a tire stem, but which valve is automatically opened and automatically unseats the tire valve when the chuck is applied properly to the tire valve stem. The upwardly extended branch 18 of the T-fitting 16 is in screw threaded engagement in the screw threaded opening 20, formed in the boss 21, which is in communication with the inflator diaphragm chamber 3.

The inflator diaphragm 5 is provided with the diaphragm plunger 23 which rests on the upper surface of said diaphragm 5. The plunger 23 has the upwardly extending axial stem 24 which extends through the bearing boss 25 into cooperative relation with the short arm 26 of the bell crank main inflator lever 27. As best shown in Fig. 1, the upper end of the stem 24 is provided with a felt oiler 28 to afford lubrication for said stem 24 in its movement in the bearing boss 25.

As best shown in Fig. 3, the lower portion of the main inflator lever 27 is H-shaped and the lower end of each leg is enlarged and provided with openings forming bearings for the fulcrum pin 30 on which said main inflator lever 27 is pivotally mounted. The inner end of said fulcrum pin 30 is rigidly mounted in an opening 31 formed in the middle wall 32 of the main casing 1. The outer end of said fulcrum pin 30 is supported in an opening in the support lug 34 which is conveniently formed as a part of the main casing 1. Said fulcrum pin 30 is supported intermediate of its length in an opening in the lug 35, which conveniently is formed as part of the main casing 1. A spacing washer 36 is carried on the fulcrum pin 30 and is interposed between the lug 34 and the enlarged lower end of the outer leg 27' of the H-shaped main inflator lever 27. We find it convenient to mount felt oilers 37 and 38 on the fulcrum pin 30 at the opposite sides of the lug 35 to afford lubrication for the main inflator lever 27 in its pivotal movements on the fulcrum pin 30.

As best shown in Figs. 1 and 3, the inflator spring 40 is operatively connected at its right-hand end to the upper end of the main inflator lever 27. The left-hand end of said spring 40 carries the nut 41 which is in screw threaded engagement with the adjusting screw 42 which conveniently is cut on the shaft 43, the left-hand end of which extends exterior to the casing 1. The left-hand end of said shaft 43 is provided with a crank handle (not shown) by which said spring 40 may be adjusted. The stresses of said spring 40 may be increased by turning the shaft 43 clockwise or decreased by turning said shaft 43 counterclockwise. Said shaft 43 is journalled at its left-hand end in the bearing 45 which is press fitted in the flanged opening 46 formed in said main casing 1. Said shaft 43 is provided with the reduced diameter portion 47 and said shaft 43 is prevented from axial displacement in the bearing 45 by means of the spring 50, lock pin 51 and spring retaining nut 52.

Figure 13:
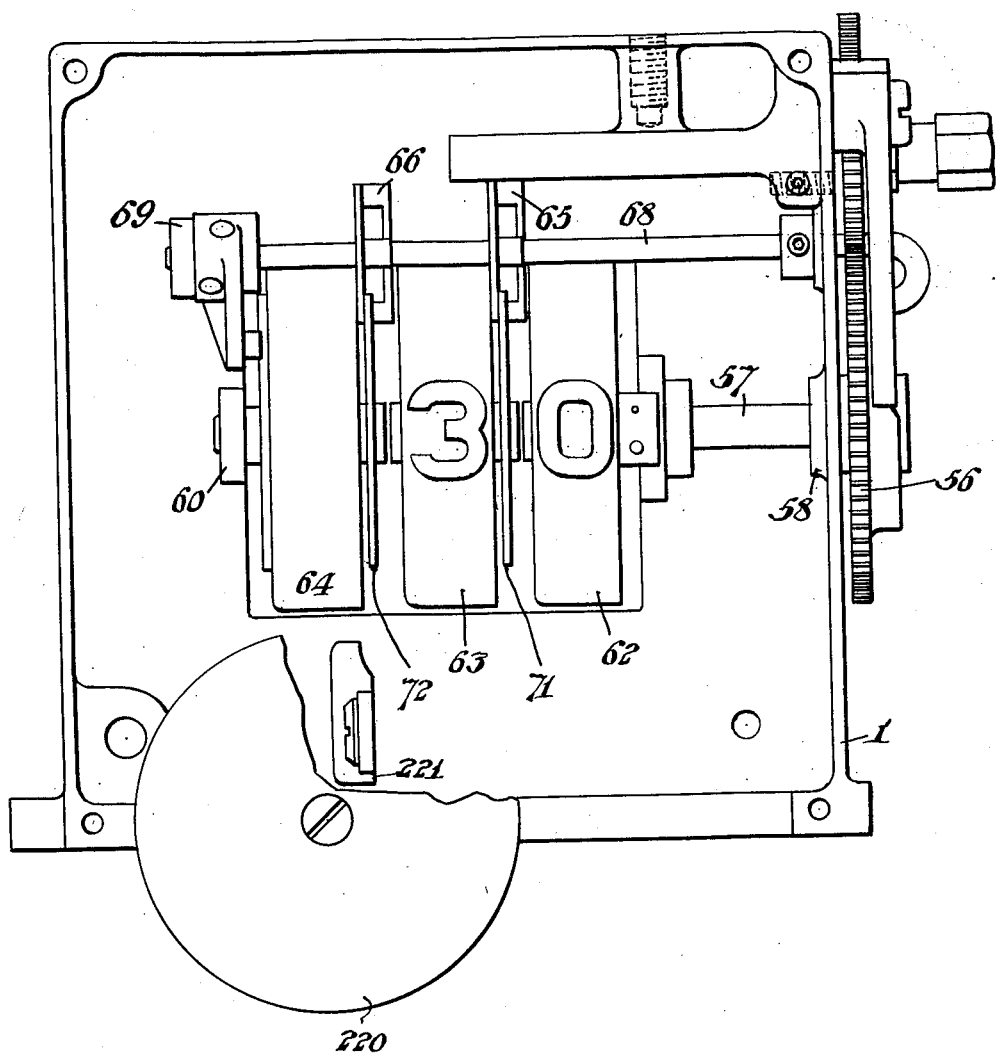
Fig. 13 is an elevation of the opposite side of the structure shown in Fig. 1.

The shaft 43 is connected with indicating means for manifesting in pounds the pressure of the fluid to be dispensed and for which the spring 40 has been manually adjusted. Such means include the gear 54 which is rigidly mounted on the shaft 43. Said gear 54 meshes with the gear 56 which is rigidly mounted on the indicator wheel shaft 57. As shown in Fig. 13, the right-hand end of said shaft 57 is journalled in a bearing 58 formed in the wall of said main casing 1, and the left-hand end of said shaft 57 is journalled in the bearing 60 which conveniently is formed as a lug on the semi-cylindrical portion 61 of the intermediate wall 32 of the main casing 1. Said shaft 57 has connected therewith the number wheel 62 which has on its circumference a series of numbers from 1 to 9 inclusive and zero. Said wheel 62, which indicates individual pounds, is connected by tens-transfer gearing with the similarly numbered intermediate wheel 63, each of the numbers on said wheel 63 representing 10 pounds. Said intermediate wheel 63 is operatively connected with the similarly numbered wheel 64, the numbers on which respectively represent one hundred pounds. A connection between the number wheels is conveniently effected by respective transfer pinions 65 and 66 which are loosely journalled on the shaft 68. The right-hand end of said shaft 68 is mounted in the side wall of the casing 1 and the left-hand end of said shaft 68 is mounted in the lug 69. Said pinions are intermittently turned by respective sectoral gears 71 and 72 in the well known manner of operation of tens-transfer mechanisms and by which, upon a complete rotation of the succesive numbered wheels of lower order, the wheel of next higher order is turned one-tenth of a revolution. As indicated by the dials in Fig. 13, the screw 42 has been manually adjusted to assure dispensation of compressed air through the fluid service conduit to charge an automobile tire, or other receiver, with a fluid pressure of 30 pounds per square inch. For convenience, we have omitted the showing of any of the numbers which appear upon the peripheries of the wheels 62, 63, and 64, except the number 3 on the wheel 63 and the zero on the wheel 62.

As best shown in Figs. 1 and 3, the main inflator lever 27 is provided with the boss 73 in which is rigidly fixed a stud 74 on which the roller 75 is mounted with freedom of turning movement. Said main lever 27 is also provided with the boss 76 in which is rigidly mounted the stud 77 which restricts the movement of the main lever 27, as hereinafter described.

As best shown in Figs. 1, 3, 7 and 8, the valve cam and unit assembly plate 78 is rigidly mounted in the casing 1 by a series of cap screws 78ᵃ, one of which is shown in Fig. 1, which extend through openings 78ᵇ in said plate 78 into matching screw threaded openings in the wall of said casing 1. Said plate 78 is provided at its upper right-hand side with the arcuate recess 80 to accommodate the boss 76 in the movement of the lever 27, as hereinafter described. Said plate 78 is provided with the elongated hole 81 through which the stud 77 projects. The valve body 105 is rigidly fastened to the plate 78 by means of a cap screw 79 which extends through the plate 78 into screw threaded engagement with the screw threaded opening 82 formed in the valve body 105.

Said plate 78 is provided with the stud 83 on which the hub 84, carrying the valve cam 85 and the auxiliary cam 86, is mounted with freedom of pivotal movement. The cam 85 is rigidly mounted on the hub 84 and the auxiliary cam 86 is mounted on the hub 84 with freedom of turning movement. Said cam 85 is provided intermediate of its opposite ends with the elongated opening 87 and is provided at its upper end with the slightly elongated opening 88. Said cam 85 has at its upper end the oppositely inclined cam surfaces 89 and 89'.

The auxiliary cam 86 is provided at its upper end with the cam stop pin 90 which is rigidly mounted in the opening 91 formed in said cam 86. The stop pin 90 extends through the opening 88 formed in the cam 85 and said stop pin 90 is provided with the enlarged head 92. The auxiliary cam 86 is provided intermediate of its ends with the elongated opening 93. The stud 95 is rigidly fixed in the plate 78 and said stud 95 projects through the opening 93 formed in the cam 86 and the opening 87 formed in the cam 85 to limit movement of both of said cams, in the manner hereinafter described. Said auxiliary cam 86 is provided with the studs 96 and 97 which are mounted in integral relationship with said auxiliary cam 86, conveniently by peening over the reduced ends of the studs 96 and 97 which extend respectively through openings 98 and 99 formed in said auxiliary cam 86.

Lubrication of the bearing hub 84 and the stud 83 on which it is pivotally mounted is effected by means of an oil wick positioned in a hole 100 formed in the bearing hub 84.

As best shown in Figs. 4, 5, and 6, the valve assembly includes the manifold 13 and the valve body 105 which are clamped together by the cap screws 106 which extend through openings 107 in the manifold 13 into screw threaded engagement in the screw threaded openings 108 formed in the valve body 105. A gasket is interposed between the manifold 13 and valve body 105 to maintain said manifold 13 and valve body 105 in fluid tight relationship. The conduit fitting 14 in the valve manifold 13 is in open communication with the passageway 110 formed in the manifold 13. Said passageway 110 is in open communication at its upper end with the passageway 112 formed in the manifold 13 at right angles to the passageway 110. The passageway 112 is enlarged at its inner end and screw threaded for engagement with the screw threaded orifice member 113 which has the axial restrictive opening 114 therethrough. We find it convenient to provide the orifice member 113 with the screen 115 for removing any foreign matter entrained in the fluid passing from the source of supply to the valve chamber.

The inner end of the orifice member 113 projects into the opening 116 formed in the valve body 105, and the opening 116 is in open communication with the valve chamber 117 in which is located the motor valve 120. Said motor valve 120 is stressed towards its seat 121 by the spring 122, the inner end of which is engaged in the socket 123 formed in the motor valve 120 and the outer end of the spring 122 is engaged in the socket 125 formed in the closure plug 126 which is in screw threaded engagement with the screw threaded opening 127 formed in the valve body 105. The motor valve 120 is provided with the reduced stem portion 128 and the enlarged end portion 129 which is in sliding engagement in the passageway 130 formed in the valve casing 105. The right-hand end of the enlarged portion 129 of the motor valve 120 is adapted to be engaged by the reduced inner end of the push rod 132 which is slidably fitted in the passageway 130. The push rod 132 is preferably lapped in the passageway 130 with light oil, or jewelers' rouge and machine oil, to insure that the push rod 132 is freely fitted, but with a maximum clearance of, say, approximately 0.0010 in the passageway 130.

The outer end of the push rod 132 is screw threaded into the link assembly 135 which is rigidly fastened to the push rod 132 by means of the set screw 136. The outer end of the link assembly 135 is bifurcated and provided with the connecting link 137 pivotally mounted within the bifurcated arms on the pivot pin 138. The connecting link 137 is provided with the opening 139 in which the stud 96 of the auxiliary cam 86 is pivotally mounted. The push rod 132 is lubricated in its reciprocatory movement in the passageway 130 by means of an oil wick in the opening 140 formed in the valve casing 105.

The passageway 130 is provided with the exhaust port opening 141 through which air is exhausted to the atmosphere from the motor diaphragm chamber 2 as hereinafter described. Said exhaust port 141 is adapted to be closed by the push rod 132 when said rod 132 is moved to the left to open the motor valve 120 in the manner hereinafter described.

The passageway 130 is in open communication with the passageway 143, the outer end of which has free fitted therein the dowel bushing 144. The opposite end of said dowel bushing 144 is push fitted in the enlarged portion of the passageway 145, formed in the manifold 13, and communication between the passageway 143 and L-shaped passageway 145 is effected through the axial opening in the dowel bushing 144. The passageway 145 is in open communication with the passageway 146 to which the conduit 147 is connected. The conduit 147 is connected at its opposite end to the motor diaphragm chamber 2, as indicated in Fig. 1. As best shown in Fig 5, the passageway 145 is connected to the passageway 148 formed at right angles thereto in the manifold 13. Said passageway 148 is enlarged at its inner end and provided with the push fitted dowel bushing 150, the opposite end of which is free fitted in the enlarged end of the exhaust port 141. The outer end of the passageway 145 is conveniently sealed by the soldered screw threaded plug 151.

Said inlet passageway 110 is also in open communication with the passageway 152 formed in the manifold 13 at right angles to the passageway 110. The passageway 152 is enlarged at its inner end and provided with the push fitted dowel bushing 153. The opposite end of said dowel bushing 153 is free fitted into an opening formed in the valve chamber 154 in which is located the main inflator valve 155. Said main valve 155 is stressed towards its seat 156 by the spring 157, the inner end of which is engaged in the socket 159 formed in the main valve 155, and the outer end of the spring 157 is engaged in the socket 160 formed in the closure plug 161 which is in screw threaded engagement with the screw threaded opening 162 formed in the valve body 105. The main valve 155 is provided with the stem portion 163 which is slidably fitted in the passageway 164 formed in the valve casing 105. The right-hand end of the valve stem 163 of the main valve 155 is adapted to be engaged by the reduced inner end of the push rod 167 which is slidably fitted in the passageway 164. Said passageway 164 is enlarged at its outer end and provided with the packing 168 and packing gland nut 169. The outer end of the push rod 167 is screw threaded into the link assembly 170 which is rigidly fastened to the push rod 167 by means of the set screw 171. The outer end of the link assembly 170 is bifurcated and provided with the connecting link 172 pivotally mounted within the bifurcated arms on the pivot pin 173. The connecting link 172 is provided with the opening 175 in which the stud 97 of the auxiliary cam 86 is pivotally mounted.

As best shown in Fig. 6, the outlet chamber 177 from the main valve 155 is in open communication with the passageway 178, formed in the manifold 13, through the dowel bushing 179 which is free fitted into the enlarged end of the passageway 178. The passageway 178 is in open communication with the passageway 180 to which is connected the conduit 15 leading from the valve manifold 13 to the T-fitting 16, which is operatively connected to the inflator diaphragm chamber 3 and fluid service conduit 17a. The outer end of said passageway 178 is conveniently closed by the soldered screw threaded plug 181.

The motor diaphragm 4 is provided with the diaphragm plunger 185 which rests upon the upper surface of the diaphragm 4. The plunger 185 has the upwardly extending axial stem 186 which extends through the bearing boss 187 into cooperative relation with the short arm 189 of the motor lever 190. As best shown in Fig. 1, the upper end of the stem 186 is provided with a felt oiler 191 to afford lubrication for said stem 186 in its movement in the bearing boss 187.

As best shown in Fig. 2, the lower portion of the motor lever 190 is bifurcated and provided with openings forming bearings for the fulcrum pin 192 on which said motor lever 190 is pivotally mounted. The inner end of the fulcrum pin 192 is rigidly mounted in an opening 193 formed in the middle wall 32 of the main casing 1. The outer end of said fulcrum pin 192 is supported in an opening in the support lug 195 which is conveniently formed as part of the main casing 1. We find it convenient to mount a pair of felt oilers 196 on the fulcrum pin 192, intermediate of the bifurcated arms of the motor lever 190, to afford lubrication for the motor lever 190 in its pivotal movement on the fulcrum pin 192.

As best shown in Figs. 1 and 2, the motor lever spring 197 is operatively connected at its left-hand end to the upper end of the motor lever 190. The right-hand end of the spring 197 is connected in the opening 198 formed in the extending ear at the upper right-hand corner of the valve cam and unit assembly plate 78.

The left-hand end of the lever 200 is pivotally mounted on the pin 201 which is rigidly fixed in the bearing boss 202 formed at the upper part of the motor lever 190. The right-hand end of the lever 200 is provided with the roller 203 pivotally mounted in the pin 204 carried by the lever 200. As best shown in Fig. 1, the roller 203 is stressed toward engaging contact with the cam surfaces 89 and 89' of the cam 85 by means of the spring 205. The upper end of the spring 205 is engaged in the opening 207 formed in the lever 200, intermediate of its ends, and the lower end of the spring 205 engages and encircles the pin 209 which is rigidly fixed in the bottom wall 7 of the main casing 1. The spring 205 continually stresses the lever 200 in a clockwise direction.

We find it desirable to provide our improved mechanism with a lockout device as a precautionary measure to positively prevent unintended operation of our device which might be caused by a small leakage of air resulting from leaks in the hose or at the hose chuck valve after the device has been in use for a considerable period of time. Any leakage of air at the hose or chuck valve would probably be negligible, as far as the loss of compressed air is concerned, but such leakage might incidentally cause our device to pulsate after the termination of an inflating operation. The form of lockout mechanism which we have illustrated consists of a pivoted lever 212 which is rigidly mounted on the pivot pin 213, the opposite ends of which are pivotally mounted in the bearing bosses 215 and 216 which are conveniently formed as an integral part of the bottom wall 7 of the main casing 1. Said lever 212 is provided at its upper end with the rollers 217 which are interposed in the path of the cams 85 and 86 to prevent movement thereof when the lever 212 has been moved counter-clockwise manually or by the hanging of the hose 17a on a support hook operatively connected to said lever 212.

We find it convenient to provide our device with means to audibly indicate the beginning, continuance, and termination of such delivery when the predetermined pressure has been reached. Such audibly indicating means includes a bell 220 which is arranged to be struck by the bell clapper 221 upon each pulsation of the mechanism. The clapper 221 is operated by the arm 223 of the cam 85 coming into engagement with a lever in operating relation with the clapper 221. The use of such an audible signal forms no part of our present invention and is old and well known in the art.

To facilitate the mounting of our device in an outer decorative casing, we find it convenient to provide the main casing 1 with flanged brackets, such as indicated at 225 and 226 by which the mechanism inclosed in the casing 1 may be readily and facilely secured to the wall of an outer casing.

Operation

The form of our fluid dispensing apparatus operates as follows:

Assuming that it is desired to inflate an automobile tire to a pressure of 30 pounds per sq. in., the operator turns the crank handle at the end of the shaft 43 to move the indicating dials to a position where the numeral 30 appears, as indicated in Fig. 13. The operator then presses the air chuck 17b upon the stem of the automobile tire which opens the tire valve and likewise moves the valve in the air chuck 17b to open position against the pressure of air in the hose 17a. If the pressure in the tire is below the pressure of 30 pounds to which the apparatus has been set, the air under high pressure in the hose 17a, T-fitting 16, inflator diaphragm chamber 3 and conduit 15, etc., tends to equalize with the pressure in the tire, thereby reducing the pressure in the inflator diaphragm chamber 3.

When the pressure in the inflator diaphragm chamber 3 is reduced to a point where such pressure no longer can overcome the effective forces of the spring 40, the spring 40 moves the pivotally mounted main inflator lever 27 counter-clockwise. The roller 75 being mounted on the stud 74 rigidly fixed in the lever 27, counter-clockwise movement of the lever 27 causes the roller 75 to engage the valve cam 85 pivoted on the stud 83, and moves said cam 85 counter-clockwise. The crest of the valve cam 85 is formed at the junction of the oppositely inclined cam surfaces 89 and 89'. When said crest of the cam 85 has moved a sufficient distance to the left under the roller 203, the cam 85 is moved suddenly in a counter-clockwise direction because of the tension of the spring 205 on the lever 200 carrying the roller 203. The cam 85 moves counter-clockwise until its movement is arrested by the right-hand side of the elongated opening 87 of the cam 85 coming into engaging contact with the stud 95 which is rigidly mounted on the valve cam and unit assembly plate 78. During such counter-clockwise movement of the cam 85, the right-hand side of the slightly elongated opening 88 at the top of the valve cam 85 comes into engagement with the pin 90 which is rigidly mounted in the auxiliary cam 86 and which pin 90 projects through the opening 88 of the cam 85. Therefore, the counter-clockwise movement of the valve cam 85 also picks up and moves counter-clockwise the auxiliary cam 86.

The auxiliary cam 86 has rigidly mounted therein the rearwardly extending studs 96 and 97 which are respectively pivotally connected to the motor valve link assembly 135 and the main valve link assembly 170. Accordingly, counter-clockwise movement of the auxiliary cam 86 moves the push rods 132 and 167 to the left. Movement of the push rod 132 to the left causes its left-hand end to come into engagement with the right-hand end portion 129 of the motor valve 120 which causes said motor valve 120 to be opened against the effective forces of its spring 122. Movement of the push rod 167 to the left causes the left-hand end thereof to engage the right-hand end of the valve stem 163 to effect opening movement of the main valve 155.

It is to be noted that the foregoing described counter-clockwise movement of the lever 27 is limited by the stud 77, rigidly fixed in the lever 27, coming into engagement with the left-hand side of the elongated opening 81 formed in the plate 78. Accordingly, the lever 27 moves only a distance sufficient to cause the crest of the cam 85 to pass beneath the roller 203, and at which point the cam 85 has not been moved sufficiently to cause the push rods 132 and 167 to be moved to valve opening position. After the crest of the cam has passed beneath the roller 203, the further counter-clockwise movement of the cam 85 is effected through the forces of the spring 205 transmitted through the roller 203 to the inclined cam surface 89'.

When the push rods 132 and 167 are moved to the left to respectively open the motor valve 120 and the main valve 155, the reduced end of the push rod 132 is moved to the left past the exhaust port 141 and the full diameter of the push rod 132 causes exhaust port 141 to become closed.

When the main valve 155 is in open position, air under high pressure flows through the inlet conduit fitting 14, passageway 110, the passageway through the dowel bushing 153, chamber 154, past the main valve 155, through the passageway 177 and dowel bushing 179, passageway 178 and passageway 180 to the conduit 15, and thence to the T-fitting 16, hose 17a, chuck 17b, and past the open tire valve into the tire. High pressure air also flows from the T-fitting 16 through the upwardly extending branch 18 to the inflator diaphragm chamber 3 beneath the diaphragm 5. When the pressure in the diaphragm chamber 3 rises to a point at which the effective forces of the spring 40 are overcome, the main lever 27 is moved clockwise.

The motor valve 120 having been opened simultaneously with the main valve 155, air under high pressure also flows through the conduit passageway 110, passageway 112, screen 115, through the restrictive opening 114 in the orifice member 113, valve chamber 117, past the opened valve 120, around the reduced stem portion 128 of the valve 120, through the passageway 143 and the opening through the dowel bushing 144, through passageway 145, passageway 146, conduit 147 and to the motor diaphragm chamber 2 beneath the motor diaphragm 4. Because of the restrictive opening 114, air flows comparatively slowly past the motor valve 120 and thence to the motor diaphragm chamber 2, as described above, and pressure in the motor diaphragm chamber 2 builds up gradually against the motor diaphragm 4. As hereinbefore stated, the movement of the push rod 132 to the left has caused the full diameter of the push rod 132 to effect closure of the exhaust port 141.

As the pressure on the motor diaphragm 4 is increased, the motor lever 190, pivoted on the pin 192, is moved counterclockwise against the effective forces of the spring 197, the right-hand end of which is anchored in the hole 198 in the valve cam and unit assembly plate 78. Counter-clockwise movement of the lever 190 causes the lever 200, pivoted on the stud 201 carried by the motor lever 190, to be moved to the left, as in Fig. 1. Such movement of the lever 200 to the left causes the roller 203 to ride up the inclined cam surface 89' of the cam 85 until the roller 203 reaches the crest of the cam 85. Whereupon, the cam 85 is moved suddenly in a clockwise direction as the roller 203 moves down the inclined cam surface 89 of the cam 85 under the effective forces of the spring 205. The cam 85 moves clockwise until it is stopped by coming into engagement with either the roller 75 or by the left-hand side of the elongated opening 87 coming into engagement with the stop pin 95.

As the cam 85 moves clockwise it is followed by the motor valve push rod 132 and main valve push rod 167 until the elongated opening 93 of the auxiliary cam 86 comes into engagement with the stud 95, which stops the push rods 132 and 167 in the respective positions indicated in Figs. 4, 5 and 6. When in such position, the push rod 132 has been moved to the right so as to open the exhaust port 141 to atmosphere, thereby permitting air to escape quickly to the atmosphere from motor diaphragm chamber 2, through the conduit 147, passageway 146, passageway 148, through the axial opening in the dowel bushing 150, and to the exhaust port passageway 141 and thence to atmosphere. As air is exhausted to the atmosphere from the diaphragm chamber 2, the pressure is quickly reduced on the motor diaphragm 4 which enables the spring 197 to move the motor lever 190 in a clockwise direction until the upper end of the lever 190 stops against the abutment on the plate frame 78.

It is to be noted that when the push rods 132 and 167 are moved to the right as above described, the motor valve 120 and the main valve 155 are permitted to be closed by their respective springs 122 and 157, thereby shutting off high pressure air from the conduit 110 to the conduit 147 and to the conduit 15 to which the dispensing hose 17a is connected.

As the lever 200 is moved to the right, as explained above, the roller 203 is also restored to its initial position toward the right, where it approaches the crest of the cam 85, but holds the cam 85 toward the right against the stop stud 95 unless the main lever 27 again initiates a movement of the cam 85 in a counter-clockwise direction to start another cycle.

When the main valve 155 has been closed as described above, the pressure of air in the inflator diaphragm chamber 3 again tends to equalize with the pressure in the tire, or receiver, and if the pressure in the tire has not yet reached that to which the device is set, the effective forces of the spring 40 again move the lever 27 counter-clockwise to again move the cam 85 counter-clockwise to cause an opening of the valve 155 and valve 120 to allow another surge of air to flow to the tire as described above.

However, when the pressure in the tire reaches the pressure for which the device is adjusted, the pressure in the diaphragm chamber 3 is sufficient to retain the lever 27 in a position at or approaching the limit of its clockwise movement. Accordingly, the main valve 155, and motor valve 120, remain closed and any further communication of air under high pressure from the inlet passageway 110 to the conduit 147 and to the outlet conduit 15 is prevented. Thereupon, the operator removes the chuck 17b from the stem of the tire and the air under high pressure in the hose 17a holds the valve of the air chuck 17b closed. Of course, when the chuck 17b is removed from the valve stem of the automobile tire, the spring of the valve therein moves that valve to closed position and retains the desired set pressure of air in the tire.

It is to be noted that the right-hand position of the push rods 132 and 167 is determined by the elongated opening 93 of the auxiliary cam 86 coming into engagement with the stop stud 95. The cam 85 is provided with the elongated opening 88 so that when the cam 85 is at its extreme right-hand position against the stop stud 95, there is clearance between the auxiliary cam stop stud 90 and the left-hand side of the elongated opening 88 of the cam 85. Thus, when a cycle of operation is initiated by the lever 27, the initial motion of the cam 85 under the roller 203 is resisted only by the tension of the spring 205.

Such lost motion provided by the elongated opening 88 of the cam 85 permits the mechanism to be calibrated accurately. Accurate calibration would not be possible if the lever 27 had to initiate cycles of operation against variable air pressure on the left-hand end of the plunger 167 and against the friction of the packing gland 168.

It is obvious that various modifications may be made in our invention without departing from the essential features thereof as defined in the appended claims and, therefore, we do not desire to limit ourselves to the precise details of construction and arrangement hereinabove set forth.

We claim:

1. A fluid dispensing apparatus which includes a motor diaphragm chamber and an inflator diaphragm chamber, each chamber containing pressure sensitive means including a reciprocatory diaphragm; a supply conduit through which fluid under pressure is supplied to said chambers; a motor valve controlling communication between said fluid pressure supply conduit and said motor diaphragm chamber; an inflator valve controlling communication between said fluid pressure supply conduit and said inflator diaphragm chamber; respective springs opposed to the fluid pressure on said motor diaphragm and said inflator diaphragm; means for adjustably varying the pressure of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; a pivotally mounted cam; means carried by said main lever for effecting pivotal movement of said cam; means carried by said motor lever for effecting pivotal movement of said cam; a pivotally mounted auxiliary cam; means operatively connecting said first-mentioned cam and said auxiliary cam; and means operatively connected to said auxiliary cam and to both said motor valve and said main valve for operating said valves.

2. A fluid dispensing apparatus which includes a motor diaphragm chamber and an inflator diaphragm chamber, each chamber containing pressure sensitive means including a reciprocatory diaphragm; a supply conduit through which fluid under pressure is supplied to said chambers; a motor valve controlling communication between said fluid pressure supply conduit and said motor diaphragm chamber; an inflator valve controlling communication between said fluid pressure supply conduit and said inflator diaphragm chamber; respective springs opposed to the fluid pressure on said motor diaphragm and said inflator diaphragm; means for adjustably varying the pressure of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; a pivotally mounted cam; means carried by said main lever for effecting pivotal movement of said cam; means carried by said motor lever for effecting pivotal movement of said cam; a pivotally mounted auxiliary cam; means operatively connecting said first-mentioned cam and said auxiliary cam; and linkage means operatively connected to said auxiliary cam and to both said motor valve and said main valve for operating said valves.

3. A fluid dispensing apparatus which includes a motor diaphragm chamber and an inflator diaphragm chamber, each chamber containing pressure sensitive means including a reciprocatory diaphragm; a supply conduit through which fluid under pressure is supplied to said chambers; a motor valve controlling communication between said fluid pressure supply conduit and said motor diaphragm chamber; an inflator valve controlling communication between said fluid pressure supply conduit and said inflator diaphragm chamber; respective springs opposed to the fluid pressure on said motor diaphragm and said inflator diaphragm; means for adjustably varying the pressure of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; a pivotally mounted cam; means carried by said main lever for effecting pivotal movement of said cam; means carried by said motor lever for effecting pivotal movement of said cam; a pivotally mounted auxiliary cam; lost motion means operatively connecting said first-mentioned cam and said auxiliary cam; and means operatively connected to said auxiliary cam and to both said motor valve and said main valve for operating said valves.

4. A fluid dispensing apparatus which includes a motor diaphragm chamber and an inflator diaphragm chamber, each chamber containing pressure sensitive means including a reciprocatory diaphragm; a supply conduit through which fluid under pressure is supplied to said chambers; a motor valve controlling communication between said fluid pressure supply conduit and said motor diaphragm chamber; an inflator valve controlling communication between said fluid pressure supply conduit and said inflator diaphragm chamber; respective springs opposed to the fluid pressure on said motor diaphragm and said inflator diaphragm; means for adjustably varying the pressure of the spring opposed to said inflator diaphragm; a motor lever operatively connecting said motor diaphragm with the spring opposed to the fluid pressure on said motor diaphragm; and a main lever operatively connecting said inflator diaphragm with the spring opposed to the fluid pressure on said inflator diaphragm; a pivotally mounted cam; means carried by said main lever for effecting pivotal movement of said cam; means carried by said motor lever for effecting pivotal movement of said cam; a pivotally mounted auxiliary cam; lost motion means operatively connecting said first-mentioned cam and said auxiliary cam including a stud rigidly fixed on said auxiliary cam and extending through an opening formed in said first-mentioned cam; and linkage means operatively connected to said auxiliary cam and to both said motor valve and said main valve for operating said valves.

5. In a device for inflating a pneumatic tire by pulsations of air under high pressure; the combination with a first conduit for supplying air under high pressure; a second conduit for delivering air under pressure; a third conduit; valve means for controlling the flow of air from said first conduit to said second and third conduits; snap action mechanism in operating relation to said valve means; an exhaust valve in operating relation to said snap action mechanism and operatively connected to said third conduit; an adjustable pressure sensitive means operatively connected to said second conduit, said adjustable pressure sensitive means being arranged to initiate motion of said snap action mechanism to open said valve means and to close said exhaust valve upon a reduction of the pressure applied to said adjustable pressure sensitive means; a second pressure sensitive means operatively connected to said third conduit, said second pressure sensitive means being arranged to initiate motion of said snap action mechanism in the reverse direction and to close said valve means and to open said exhaust valve upon a predetermined increment in pressure in said third conduit; means for retarding the flow of air to said second pressure sensitive means to cause a time interval during which high pressure air may flow from the first conduit to the second conduit; whereby, by cyclic operation of said device, air is dispensed in pulsations from said first conduit through said second conduit until sufficient pressure is maintained in said second conduit to prevent said adjustable pressure sensitive means from initiating an additional cycle of operation.

6. A fluid dispensing apparatus which includes a motor diaphragm chamber and an inflator diaphragm chamber, each chamber containing pressure sensitive means including a reciprocatory diaphragm; a supply conduit through which fluid under pressure is supplied to said chambers; a motor valve controlling communication between said fluid pressure supply conduit and said motor diaphragm chamber; an inflator valve controlling communication between said fluid pressure supply conduit and said inflator diaphragm chamber; respective springs opposed to the fluid pressure on said motor diaphragm and said inflator diaphragm; and means for adjustably varying the pressure of the spring opposed to said inflator diaphragm; a pivotally mounted cam; means operative by said inflator diaphragm for effecting pivotal movement of said cam; and means operatively connected to said cam and to both said motor valve and said main valve for operating said valves.

7. A fluid dispensing apparatus which includes a motor diaphragm chamber and an inflator diaphragm chamber, each chamber containing pressure sensitive means including a reciprocatory diaphragm; a supply conduit through which fluid under pressure is supplied to said chambers; a motor valve controlling communication between said fluid pressure supply conduit and said motor diaphragm chamber; an inflator valve controlling communication between said fluid pressure supply conduit and said inflator diaphragm chamber; respective springs opposed to the fluid pressure on said motor diaphragm and said inflator diaphragm; and means for adjustably varying the pressure of the spring opposed to said inflator diaphragm; a pivotally mounted cam; means operative by said inflator diaphragm for effecting pivotal movement of said cam; and lost motion means operatively connected to said cam and to both said motor valve and said main valve for operating said valves.

JOSEPH C. WOODFORD.
DAVID S. WILLSON.

REFERENCES CITED

The following references are of record in the file of this patent:

UNITED STATES PATENTS

| Number | Name | Date |
|---|---|---|
| 1,827,662 | Maas | Oct. 13, 1931 |
| 2,162,474 | Barker | June 13, 1939 |